US010746642B2

United States Patent
Sun et al.

(10) Patent No.: US 10,746,642 B2
(45) Date of Patent: Aug. 18, 2020

(54) CLOSED-LOOP CONTROL METHOD BASED ON TESTING MACHINE FOR ACCURATELY CONTROLLING LOOSENESS OF BOLT TRANSVERSE LOAD

(71) Applicant: DALIAN UNIVERSITY OF TECHNOLOGY, Dalian, Liaoning Province (CN)

(72) Inventors: Qingchao Sun, Dalian (CN); Bao Zhang, Dalian (CN); Chuanhua Wang, Dalian (CN); Wei Sun, Dalian (CN); Yue Ma, Dalian (CN)

(73) Assignee: Dalian University of Technology, Dailian, Liaoning (CN)

( * ) Notice: Subject to any disclaimer, the term of this patent is extended or adjusted under 35 U.S.C. 154(b) by 24 days.

(21) Appl. No.: 16/338,872

(22) PCT Filed: Sep. 8, 2017

(86) PCT No.: PCT/CN2017/101002
§ 371 (c)(1),
(2) Date: Apr. 2, 2019

(87) PCT Pub. No.: WO2019/024174
PCT Pub. Date: Feb. 7, 2019

(65) Prior Publication Data
US 2020/0018673 A1    Jan. 16, 2020

(30) Foreign Application Priority Data

Aug. 2, 2017  (CN) .......................... 2017 1 0645938

(51) Int. Cl.
*G01N 3/24* (2006.01)
*G05B 19/04* (2006.01)

(52) U.S. Cl.
CPC .......... *G01N 3/24* (2013.01); *G05B 19/0405* (2013.01); *G01N 2203/0003* (2013.01);
(Continued)

(58) Field of Classification Search
CPC ............ G01N 3/24; G01N 2203/0003; G01N 2203/0025; G01N 2203/0202; G01N 2203/0266; G05B 19/0405
(Continued)

(56) References Cited

U.S. PATENT DOCUMENTS 3,224,070 A * 12/1965 Cunningham ..... G05B 19/0405
29/42
10,190,967 B1 * 1/2019 Rihan .................. G01N 17/006
(Continued)

FOREIGN PATENT DOCUMENTS

CN    102519652 A    6/2012
CN    102865983 A    1/2013
(Continued)

*Primary Examiner* — Octavia Hollington
(74) *Attorney, Agent, or Firm* — Muncy, Geissler, Olds & Lowe, P.C.

(57) ABSTRACT

A closed-loop control method based on a testing machine for accurately controlling the loosening of a bolt transverse load is disclosed. The testing machine for accurately controlling the loosening of the transverse load comprises a load generating motor, a load transfer mechanism, a load control motor and a load control mechanism. The control method of the present invention controls the load generating motor to drive the load transfer mechanism based on control commands, displacement signals collected by the displacement sensor and force signals collected by an S-shaped column type pressure sensor. The testing machine for the looseness of the bolt transverse load is essential in the aspect of exploring a looseness law of a bolt, and can be used to (Continued)

simulate load bearing conditions of the bolt. However, under the condition that some bolts bear constant force load transversely, the testing machine is not used or is inaccurate. The control method of the present invention can accurately control the load transverse load to be stable, especially can ensure constant transverse load and can also simulate the transverse load bearing situation of the bolt more accurately and more comprehensively.

2 Claims, 4 Drawing Sheets

(52) U.S. Cl.
CPC ............... *G01N 2203/0025* (2013.01); *G01N 2203/0202* (2013.01); *G01N 2203/0266* (2013.01)

(58) Field of Classification Search
USPC .......................................................... 73/788
See application file for complete search history.

(56) References Cited

U.S. PATENT DOCUMENTS 10,598,567 B1 * 3/2020 Sun ..................... G01M 13/022
10,620,069 B2 * 4/2020 Sun ........................... G01L 5/24

FOREIGN PATENT DOCUMENTS

| CN | 103217278 A | 7/2013 |
|---|---|---|
| CN | 105538040 A | 5/2016 |
| CN | 105784304 A | 7/2016 |
| CN | 106002481 A | 10/2016 |
| CN | 106441760 A | 2/2017 |
| KR | 20000040957 A | 7/2000 |

* cited by examiner

Number of times of load circulation
(Fig.5 as an illustration in Abstract)

Fig. 6    Fig. 7

CLOSED-LOOP CONTROL METHOD BASED ON TESTING MACHINE FOR ACCURATELY CONTROLLING LOOSENESS OF BOLT TRANSVERSE LOAD

TECHNICAL FIELD

The present invention relates to a testing machine for looseness of a bolt transverse load, and more particularly, relates to a closed-loop control method based on a testing machine for accurately controlling looseness of a bolt transverse load.

BACKGROUND

For bolted connection, the main reason for looseness is: when the bolt bears transverse (perpendicular to the bolt axis) vibration load, with the increase of the vibration force, a friction coefficient between bolt pairs is even decreased to zero, thereby damaging self-locking condition of the thread, generating slight relative slide and causing automatic rotation and looseness of the nut. In some extreme cases, the looseness of the transverse load may decrease the bolt preload by 30%-40%. The testing machine for the looseness of the transverse load can be used to research a looseness law under the condition that the bolt bears horizontal alternating load, and is very useful for researching the looseness problem of bolted connection.

The present invention is based on the testing machine for accurately controlling the looseness of the transverse load bolt. A load control part is added on the testing machine for accurately controlling the looseness of the transverse load on the basis of an original testing machine for looseness of Junker transverse load bolt, so as to better control the transverse load.

1. Ensuring Transverse Displacement Load

Figure 1:
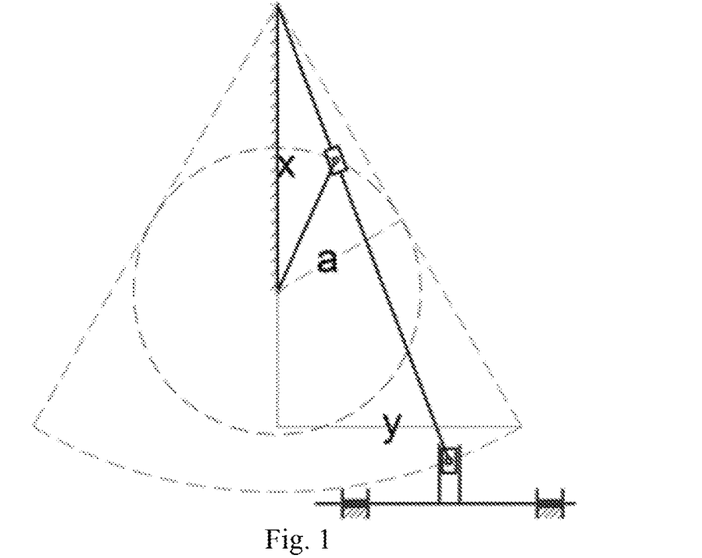
FIG. 1 is a schematic diagram of motion of a testing machine for accurately controlling loosening of a bolt transverse load.
Figure 2:
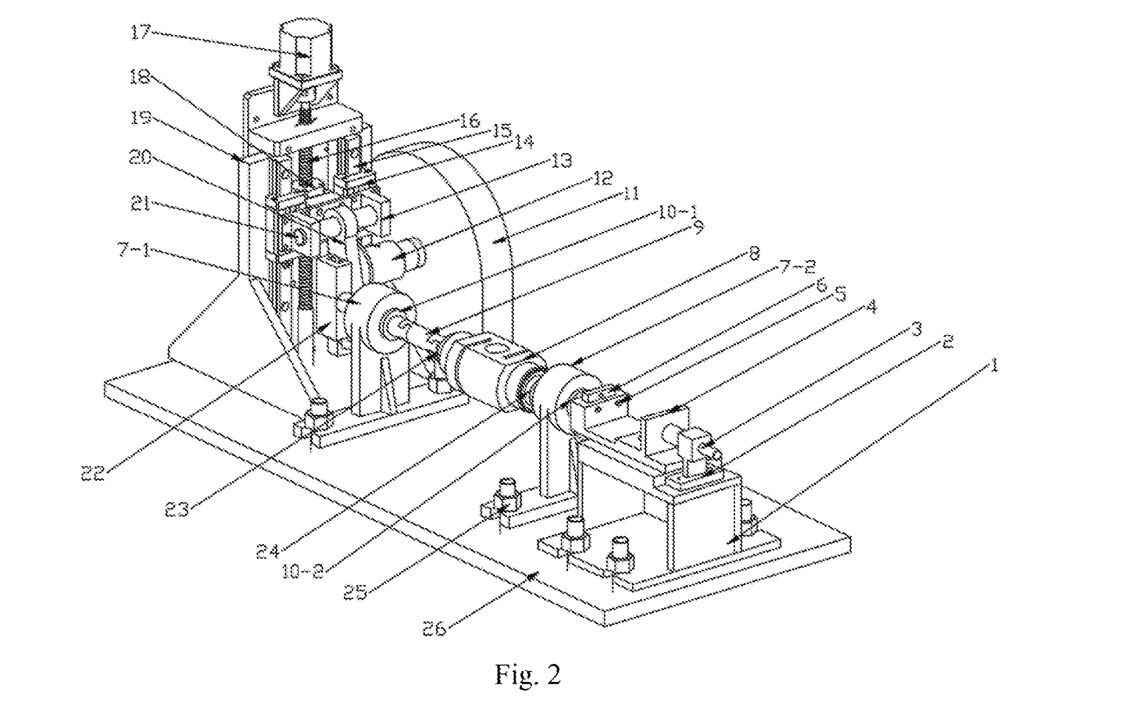
FIG. 2 is a schematic diagram of a testing machine for accurately controlling loosening of a bolt transverse load.

For the previous testing machine for looseness of the transverse load bolt, the testing machine can only provide a transverse displacement load. If the displacement load is required to be changed, the mechanical structure of the testing machine must be changed, which is high in cost and is difficult. It can be known from FIG. 1 that a fixed x value corresponds to a unique y value. Through rotation of the load control motor 17, the screw rod 16 is driven so as to drive the slide table 18 to move up and down. Namely, displacement is produced at the end of the rocking bar 20. If the x value is changed, the maximum amplitude of the generated transverse displacement is also changed. Each position at the end of the rocking bar 20 represents the maximum amplitude of one transverse displacement. A desired transverse displacement can be obtained through the control motor 17.

2. Ensuring Transverse Force Load

When the testing machine provides a transverse displacement amplitude, a transverse force load will be generated simultaneously. Along with the occurrence of looseness, the transverse force load generated by the fixed transverse displacement is gradually decreased. At this moment, if a fixed transverse force load needs to be unchanged, the generated transverse displacement amplitude shall be gradually increased. At this moment, the control motor increases the generated transverse displacement load until the force measured by an S-shaped column type tension sensor reaches a predetermined value.

How to control the above test bench to enable the test bench to achieve expected functions becomes a technical problem which must be solved in the art. Accurate control over the transverse load can be realized only based on an appropriate control method and control program.

SUMMARY

The present invention provides a closed-loop control method based on a testing machine for accurately controlling looseness of a bolt transverse load, to ensure control over the above test bench so that the test bench achieves expected functions and realizes accurate control over the transverse load.

The technical solution of the present invention:

A closed-loop control method based on a testing machine for accurately controlling looseness of a bolt transverse load is provided. The closed-loop control method is used to conduct control based on the testing machine for accurately controlling looseness of a bolt transverse load, analyze a signal connected by a sensor, conduct calculation through a PLC control system and finally issue an instruction to a motor control system for controlling the rotation of the motor, thereby realizing control of the testing machine for looseness of the bolt transverse load;

the closed-loop control method is realized based on the testing machine for accurately controlling the looseness of the transverse load; the testing machine for accurately controlling the looseness of the transverse load comprises a load transfer part and a load control part;

the load transfer part comprises a frame structural member 1, a displacement sensor support frame 2, a current vortex displacement sensor 3, a connecting plate 4, a pin 5, a limiting plate 6, a first support frame 7-1, a second support frame 7-2, an S-shaped column type displacement sensor 8, an elastic rod 9, a first linear bearing 10-1, a second linear bearing 10-2, a T-groove guide rail 22, a short-head threaded rod 23, a long-head threaded rod 24, a base station 26, a rotatable rod 27, a round cushion 28, a spacer type pressure sensor 29, a sleeve 30 and a specimen bolt 31; two support frames and the frame structural member 1 are fixed to the base station 26; the two support frames are coaxial and are spaced by a certain distance; the frame structural member 1 is located at one side of the two support frames; the T-groove guide rail 22 penetrates through the first linear bearing 10-1; the first linear bearing 10-1 is fixed to the first support frame 7-1; the T-groove guide rail 22 is tenoned with one end of the elastic rod 9; the other end of the elastic rod 9 is tenoned with the short-head threaded rod 23; the short-head threaded rod 23 is in thread fit with one end of the S-shaped column type displacement sensor 8; the other end of the S-shaped column type displacement sensor 8 is in thread fit with the long-head threaded rod 24; the long-head threaded rod 24 penetrates through the second linear bearing 10-2; the second linear bearing 10-2 is fixed to the second support frame 7-2; the long-head threaded rod 24 is tenoned with the rotatable rod 27; the rotatable rod 27 is placed in a U-groove of the connecting plate 4 and is limited through the limiting plate 6; the connecting plate 4 is placed on an upper stair of the frame structural member 1; the displacement sensor support frame 2 is fixed to a lower stair of the frame structural member 1; the current vortex displacement sensor 3 is fixed to the displacement sensor support frame 2; the plane of the frame structural member 1 is in a stair type;

a through hole is formed in the connecting plate 4; the round cushion 28 is in interference fit with the through hole; a stepped hole is formed in the plane of the frame structural member 1; the stepped hole is coaxial with the through hole; the spacer type pressure sensor 29 is placed in the stepped hole; the sleeve 30 penetrates through the spacer type pressure sensor 29; the specimen bolt 31 penetrates through the stepped hole and the through hole successively and is fixed;

the load control part comprises a load generating motor 11, an eccentric coupling 12, dual brackets 13, slide blocks 14, guide rails 15, a screw rod 16, a load control motor 17, a slide table 18, a load-bearing frame 19, a rocking bar 20 and a shaft 21; the load-bearing frame 19 is composed of a transverse bracket, a longitudinal bracket and a base; the load-bearing frame 19 is fixed to the base station 26 through the base; one end of the screw rod 16 penetrates through the transverse bracket, and is connected with the load control motor 17; the load control motor 17 is fixed to the longitudinal bracket; the other end of the screw rod 16 is fixed to the base; the slide table 18 is connected with a ball screw rod structure of the screw rod 16 together, two guide rails 15 are fixed to the longitudinal bracket; two slide blocks 14 are sheathed on the guide rails 15; dual brackets 13 are composed of two side plates and a bottom plate; the bottom plate is fixed to the two slide blocks 14 and the slide table 18; the shaft 21 penetrates through the two side plates of dual brackets 13 and is fixed; one end of the rocking bar 20 is a round sleeve structure; the other end is provided with a notch and a T type lug boss; the through hole of the rocking bar 20 penetrates through the shaft 21 and is located between the two side plates; the load generating motor 11 is fixed to the base station 26; one end of the eccentric coupling 12 is connected with an output shaft of the load generating motor 11; the other end of the eccentric coupling 12 is limited to the notch of the rocking bar 20; the T type lug boss of the rocking bar 20 is matched with the T-groove guide rail 22;

the closed-loop control method for controlling a transverse force load amplitude based on the testing machine for accurately controlling the looseness of the transverse load comprises the following steps:

step a) determining a to-be-inputted expected transverse force load amplitude $F_1$, an adjusted threshold $\Delta F$ and an error allowable value e; and starting to operate by the load control motor 17 if a difference between the practical transverse force load amplitude F and $F_1$ reaches the adjusted threshold $\Delta F$, until the difference between the practical transverse force load amplitude F and $F_1$ is less than the error allowable value e; selecting the adjusted threshold $\Delta F$ and the error allowable value e according to requirements for load stability and accuracy, wherein the smaller the adjusted threshold $\Delta F$ and the error allowable value e are, the better the load stability and accuracy are;

step b) although loosening law curves are almost the same when the bolt bears the transverse load, values of the loosening law curves are quite different; making a loosening law curve of the bolt under the condition of not adjusting the transverse load, and recording a change law curve of the corresponding transverse force load amplitude;

step c) conducting a transverse load adjusting experiment on the bolt specimen: in the process of applying the transverse load, selecting times $t_1, t_2 \ldots t_n$ uniformly in a interval $[0,t_n]$; dividing the loosening process into n intervals, i.e., $[0, t_1], [t_1, t_2] \ldots [t_{n-1}, t_n]$, wherein $t_n$ is a time at which the loosening curve tends to be steady; at times $t_1, t_2 \ldots t_n$, changing the displacement by the load control motor 17 so that the variation of the force load amplitude measured by the S-shaped column type pressure sensor 8 is $\Delta F$; recording the corresponding variation $\Delta X_i$ of the displacement of the load control motor 17; and recording $\Delta X_1, \Delta X_2 \ldots \Delta X_n$ and $i \in [1,n]$;

step d) collecting, by the spacer type pressure sensor 29, continuous preload signals P(t) and $$k = \frac{\partial P(t)}{\partial t};$$

step e) comparing a slope of curve in the loosening law curve in step b) with a k value in step d); comparing the k value at this moment with the n intervals divided in step c); determining the interval to which the bolt looseness belongs, i.e., slope values of curves are equal, wherein the reduction of the transverse force load amplitude for each interval in step c) is equal to the to-be-adjusted displacement value $\Delta X_x$ for the adjusted threshold $\Delta F$; estimating the to-be-adjusted displacement value $\Delta X_x$ when the reduction of the transverse force load amplitude starts to be equal to the adjusted threshold $\Delta F$ from this moment in the loading process; estimating the time $T_x$ required when the reduction of the transverse force load amplitude is equal to the adjusted threshold $\Delta F$ from this moment in the loading process in combination with the change law curve of the transverse force load amplitude in step b), i.e., the variations of the transverse force load amplitude within the time [0,T] are less than the threshold $\Delta F$ without adjusting the transverse load, wherein the suspension time $T_x$ of a closed-loop control program is B;

step f) making one-step adjustment $\Delta X_x$ on the load control motor 17 according to the estimated $\Delta X_x$ in step e) since the variation of the transverse force load amplitude exceeds the threshold $\Delta F$ after the suspension time $T_x$, so that the difference between the practical transverse force load amplitude F and the expected transverse force load amplitude $F_1$ is reduced to be less than the adjusted threshold $\Delta F$;

step g) conducting further precision processing because more or less errors may appear during actual operation under the condition that previous adjustment is based on estimation and adjustment in combination with the law curves; collecting transverse force load signals, and conducting peak detection on the periodical transverse force load signals collected by the S-shaped column type pressure sensor 8 to acquire the F of the practical force load amplitude F;

step h) approaching $F_1$ through a two-step method if $|F-F_1|>e$ which indicates that an adjusted final result fails to be within the set error, until $|F-F_1|<e$; and then circularly operating from step d);

step i) circularly operating directly from step d) if $|F-F_1|<e$.

The closed-loop control method for controlling a transverse displacement load amplitude based on the testing machine for accurately controlling the looseness of the transverse load comprises the following steps:

step a) determining a to-be-inputted expected transverse displacement load amplitude $A_1$, an adjusted threshold $\Delta A$ and an error allowable value e; and starting to operate by the load control motor 17 if a difference between the practical transverse displacement load amplitude A and $A_1$ reaches the adjusted threshold $\Delta A$, until the difference between the practical transverse displacement load amplitude A and $A_1$ is less than the error allowable value e; selecting the adjusted threshold $\Delta A$ and the error allowable value e according to requirements for load stability and accuracy, wherein the smaller the adjusted threshold ΔA and the error allowable value e are, the better the load stability and accuracy are;

step b) although loosening law curves are almost the same when the bolt bears the transverse load, values of the loosening law curves are quite different; making a set of loosening law curves of the bolt under the condition of not adjusting the transverse load, and recording a change law curve of the corresponding transverse displacement load amplitude;

step c) conducting a transverse load adjusting experiment on the bolt specimen: in the process of applying the transverse load, selecting times $t_1, t_2 \ldots t_n$ uniformly in a interval $[0, t_n]$; dividing the loosening process into n intervals, i.e., $[0, t_1], [t_1, t_2] \ldots [t_{n-1}, t_n]$, wherein $t_n$ is a time at which the loosening curve tends to be steady; at times $t_1, t_2 \ldots t_n$, changing the displacement by the load control motor 17 so that the variation of the displacement load amplitude measured by the current vortex displacement sensor 3 is ΔA; recording the corresponding variation $\Delta X_i$ of the displacement of the load control motor 17; and recording $\Delta X_1, \Delta X_2 \ldots \Delta X_n$ and $i \in [1, n]$;

step d) collecting, by the spacer type pressure displacement sensor 29, continuous preload signals P(t) and $$k = \frac{\partial P(t)}{\partial t};$$

step e) comparing a slope of curve in the loosening law curve in step b) with a k value in step d); comparing the k value at this moment with the n intervals divided in step c); determining the interval to which the bolt loosening belongs, i.e., slope values of curves are equal, wherein the reduction of the transverse displacement load amplitude for each interval in step c) is equal to the to-be-adjusted displacement value $\Delta X_x$ for the adjusted threshold ΔA; estimating the to-be-adjusted displacement value $\Delta X_x$ when the reduction of the transverse displacement load amplitude starts to be equal to the adjusted threshold ΔA from this moment in the loading process; estimating the time $T_x$ required when the reduction of the transverse displacement load amplitude is equal to the adjusted threshold ΔA from this moment in the loading process in combination with the change law curve of the transverse displacement load amplitude in step b), i.e., the variations of the transverse displacement load amplitude within the time [0,T] are less than the threshold ΔA without adjusting the transverse load, wherein the suspension time of a closed-loop control program is $T_x$;

step f) making one-step adjustment $\Delta X_x$ on the load control motor 17 according to the estimated $\Delta X_x$ in step e) since the variation of the transverse displacement load amplitude exceeds the threshold ΔA after the suspension time $T_x$, so that the difference between the practical transverse displacement load amplitude A and the expected transverse force load amplitude $A_1$ is reduced to be less than the adjusted threshold ΔA;

step g) conducting further precision processing because more or less errors may appear during actual operation under the condition that previous adjustment is based on estimation and adjustment in combination with the law curves; collecting transverse displacement load signals, and conducting peak detection on the periodical transverse displacement load signals collected by the current vortex displacement sensor 3 to acquire the practical displacement load amplitude A;

step h) approaching $F_1$ through a two-step method if $|A-A_1|>e$ which indicates that an adjusted final result fails to be within the set error, until $|A-A_1|<e$; and then circularly operating from step d);

step i) circularly operating directly from step d) if $|A-A_1|<e$.

The present invention has beneficial effects: the closed-loop control method based on the testing machine for accurately controlling the loosening of the bolt transverse load provided in the present invention can always keep the actual load and an ideal load to be within the error range and reasonably plan velocity of approach from the actual load to the ideal load. The present invention is faster, more accurate and more stable.

In the figures: 1 frame structural member; 2 displacement sensor support frame; 3 current vortex displacement sensor; 4 connecting plate;
5 pin; 6 limiting plate; 7-1 first support frame; 7-2 second support frame; 8 S-shaped column type displacement sensor; 9 elastic rod; 10-1 first linear bearing; 10-2 second linear bearing; 11 load generating motor;
12 eccentric coupling; 13 dual brackets; 14 slide block; 15 guide rail; 16 screw rod;
17 load control motor;
18 slide table; 19 load-bearing frame; 20 rocking bar; 21 shaft; 22 T-groove guide rail;
23 short-head threaded rod;
24 long-head threaded rod; 25 T type bolt; 26 base station; 27 rotatable rod; 28 round cushion;
29 spacer type pressure sensor; 30 sleeve; and 31 specimen bolt.

DETAILED DESCRIPTION

Specific embodiment of the present invention is further described below in combination with accompanying drawings and the technical solution.

The testing machine for accurately controlling loosening of a bolt transverse load is direct in generation of the displacement load, i.e., through transfer of the displacement. In feedback regulation, the displacement is adjusted through change feedback of displacement signals. The overall process involves the relationship among the displacements. Control is relatively simple. For force load, the force load is produced through a displacement load actually, and is fed back into a force signal; and the force signal is analyzed to adjust the displacement. Therefore, the entire process is complicated and the law is more difficult to grasp.

1. Transverse Displacement Load Control Method

A required displacement load amplitude $A_1$, an adjusted threshold $\Delta A$ and an error allowable value e are inputted firstly. The load control motor 17 starts to operate if a difference between the practical transverse displacement load amplitude A and $A_1$ reaches the adjusted threshold $\Delta A$, until the difference between the practical transverse displacement load amplitude A and $A_1$ is less than the error allowable value e.

Two groups of experiments shall be conducted before a control program is started to obtain reference data. Firstly, a loosening tendency is estimated in combination with a loosening law curve, and a slope k-value of a curve is a direct response of the tendency of the curve. Because different bolts may have different loosening laws, before an experiment is made, a loosening law curve of a specimen bolt under the condition of not adjusting the load is made as reference, and a change law curve of the corresponding transverse displacement load amplitude is recorded; secondly, as loosening occurs, the practical transverse displacement load amplitude may gradually deviate from an expected displacement load amplitude $A_1$, and because of loosening instability, the deviation is also unstable. Therefore, for the purpose of stability and high efficiency in the control process, an adjusted threshold $\Delta A$ is needed. Once the deviation reaches the adjusted threshold $\Delta A$, adjustment is made. But because of instability in the loosening process, the adjustment quantity of the load control motor each time is different. Thus, a second group of reference experiment is needed. The experiment of adjusting the transverse load is made to the bolt specimen: in the process of applying the transverse load, times $t_1, t_2 \ldots t_n$ are selected uniformly in a interval $[0, t_n]$; the loosening process is divided into n intervals, i.e., $[0, t_1], [t_1, t_2] \ldots [t_{n-1}, t_n]$, wherein $t_n$ is a time at which the loosening curve tends to be steady; at times $t_1, t_2 \ldots t_n$, the displacement is changed by the load control motor 17 so that the variation of the displacement load amplitude measured by the S-shaped column type displacement sensor 8 is $\Delta A$; the corresponding variation $\Delta X_i$ of the displacement of the load control motor 17 is recorded; and $\Delta X_1, \Delta X_2 \ldots \Delta X_n$ and $i \in [1, n]$ are recorded;

when the spacer type displacement sensor (29) collects bolt preload and displacement signals, the change rate $$k = \frac{\partial P(t)}{\partial t}$$

of bolt preload and displacement is analyzed, i.e., a slope of a real-time loosening curve; the larger the slope is, the faster the loosening is; the real-time loosening curve is compared with a previously measured loosening law curve so as to estimate the change of the transverse displacement load of a next stage in combination with the loosening law curve and the change law curve of the transverse displacement load amplitude, thereby estimating a time interval $T_x$ of the change $\Delta A$ of the transverse displacement load. i.e., the variation of the transverse displacement load amplitude is less than the threshold $\Delta A$ within the time $T_x$ from this moment; the transverse load is not required to be adjusted; and judgment is made to obtain a interval of the transverse load at this moment so as to correspondingly select $\Delta X_x$.

After the suspension time $T_x$ of the closed-loop control program, the load control motor is adjusted by one step to generate displacement change $\Delta X_x$; the transverse displacement load is changed by $\Delta A$; and at this moment, the difference between the transverse loads A and $A_1$ is small. But further precision processing is needed because more or less errors may appear during actual operation under the condition that previous adjustment is based on estimation and adjustment in combination with the law curves and the change law curve of the transverse displacement load amplitude. Therefore, transverse displacement load signals shall be collected, and peak detection is conducted on the periodical transverse displacement load signals collected by the current vortex displacement sensor (3) to acquire the practical displacement load amplitude A;

If $|A_1-A|<e$ at this moment, this step of adjustment is completed; if $|A_1-A|>e$, next step of fine adjustment is conducted to gradually approach $A_1$. During fine adjustment, because the difference between the transverse loads A and $A_1$ is small, the stability of the transverse load is relatively better during adjustment. Meanwhile, k values of preload and displacement signals $$k = \frac{\partial P(t)}{\partial t}$$

are collected for comparison, to estimate the time interval $T_x$ required for the reduction $\Delta A$ of the next transverse displacement load; and then circulation is continued, so that the difference between the actual displacement load amplitude and the ideal displacement amplitude is always kept within an allowable scope $\Delta A$, thereby ensuring accuracy of the displacement load.

2. Transverse Force Load Control Method

Figure 3:
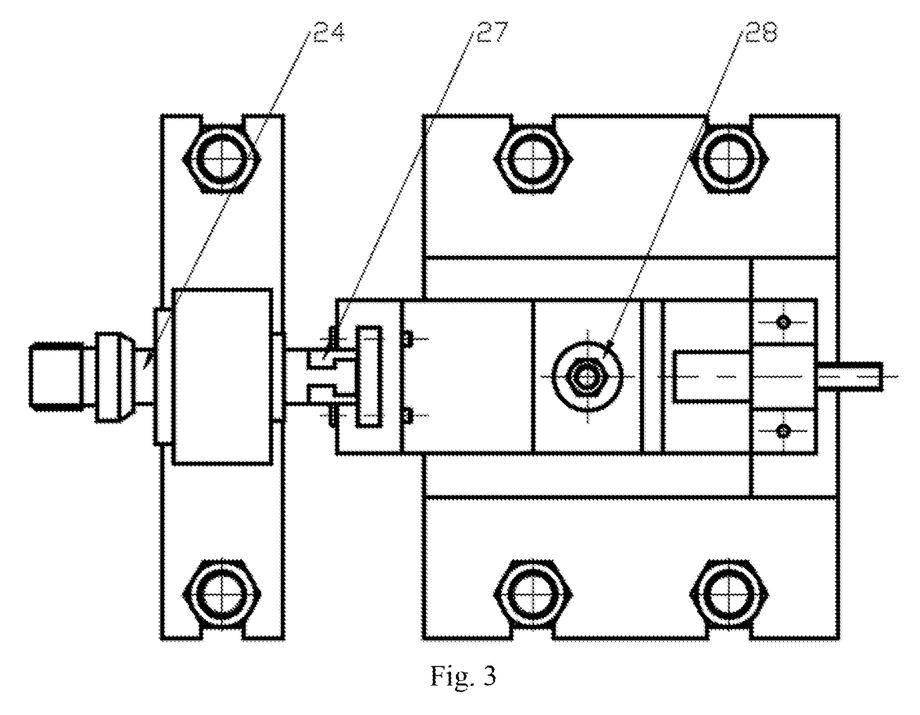
FIG. 3 is a top view of a clamp part of a testing machine for accurately controlling loosening of a bolt transverse load.
Figure 4:
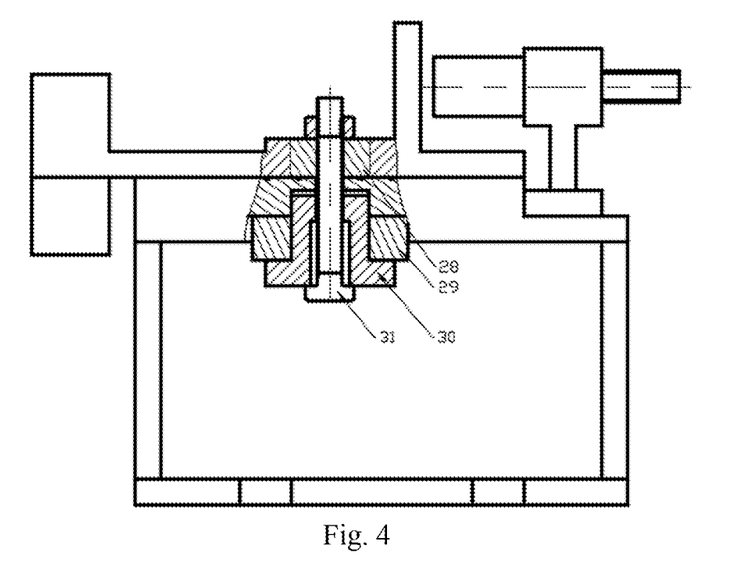
FIG. 4 is a structural sectional view of a clamp of a testing machine for accurately controlling loosening of a bolt transverse load.
Figure 5:
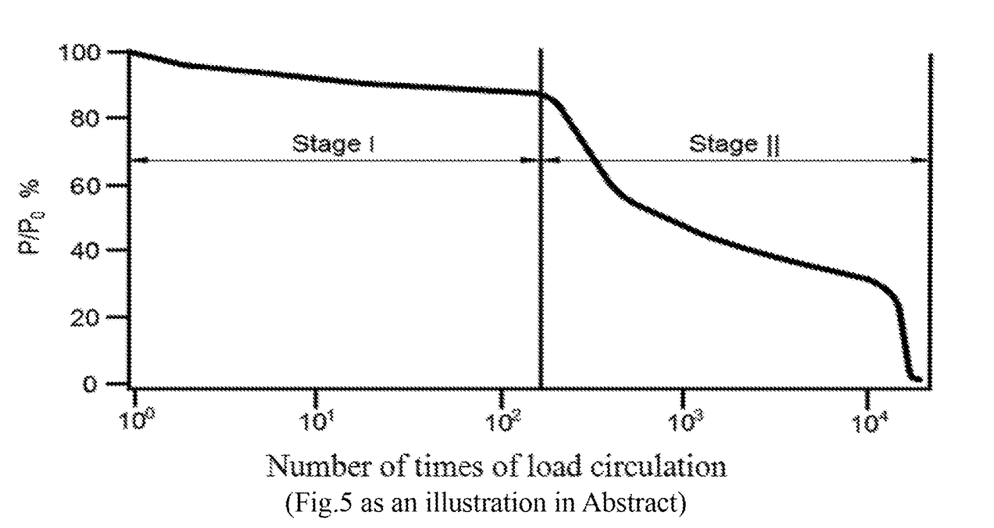
FIG. 5 is a loosening law curve of a bolt transverse load.
Figure 6:
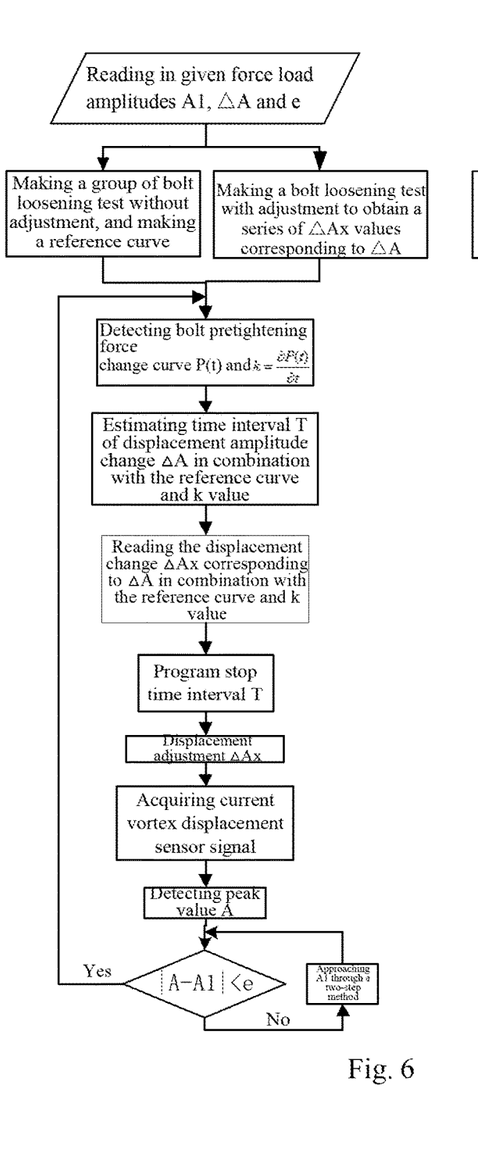
FIG. 6 is a block diagram of a control program of a transverse displacement load in the closed-loop control.
Figure 7:
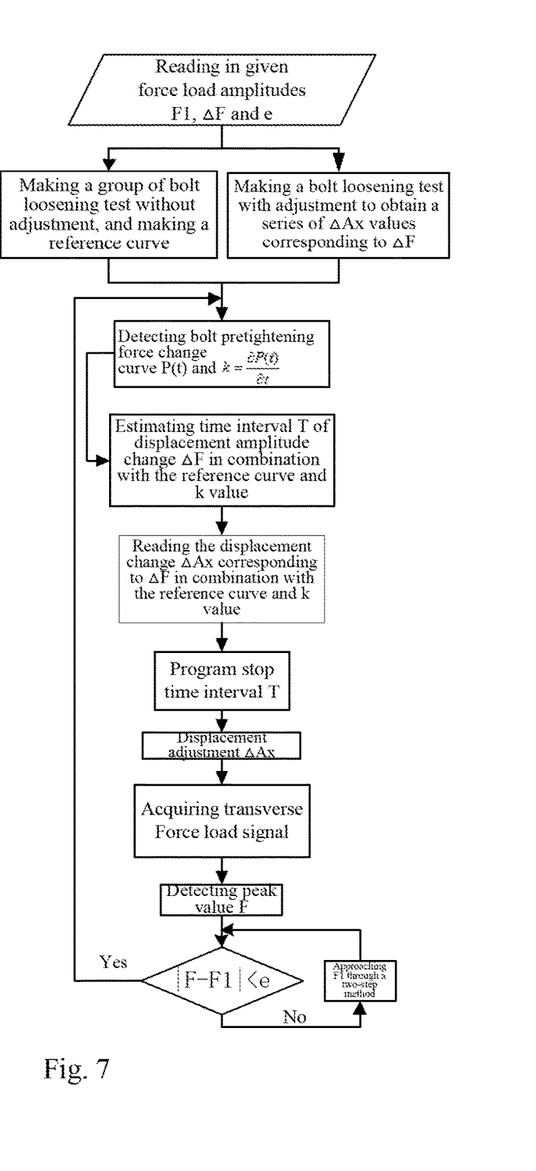
FIG. 7 is a block diagram of a control program of a transverse force load in the closed-loop control.

When loosening occurs, the transverse displacement to be loaded for the same force load will be gradually increased. The force load converted by the displacement generated by the motor will gradually deviate from the expected force load amplitude $F_1$. To stabilize the force load at $F_1$, the displacement generated at the load generating end shall be increased. FIG. 3 shows the change of the bolt preload when the bolt connection bears the transverse load, and visually displays the loosening law when the bolt connection bears the transverse load. It can be seen that the loosening speed is varied when the bolt is loosened. If the entire system is adjusted once every the same time period, due to the difference of the loosening speed, the displacement to be adjusted is also different. For example, at the initial stage of the second stage of loosening, loosening is fast during a short time and the change of the transverse force load is large. Therefore, if the transverse force load needs to be adjusted rapidly and the force load is maintained to be stable, the loosening law shall be considered.

A required force load amplitude $F_1$, an adjusted threshold $\Delta F$ and an error allowable value e are inputted firstly. The load control motor 17 starts to operate if a difference between the practical transverse force load amplitudes F and $F_1$ reaches the adjusted threshold $\Delta F$, until the difference between the practical transverse force load amplitudes F and $F_1$ is less than the error allowable value e.

Two groups of experiments shall be conducted before a control program is started to obtain reference data. Firstly, a loosening tendency is estimated in combination with a loosening law curve, and a slope k-value of a curve is a direct response of the tendency of the curve. Because different bolts may have different loosening laws, before an experiment is made, a loosening law curve of a specimen bolt under the condition of not adjusting the load is made as reference, and a change law curve of the corresponding transverse force load amplitude is recorded; secondly, as loosening occurs, the practical transverse force load amplitude may gradually deviate from an expected force load amplitude $F_1$, and because of loosening instability, the deviation is also unstable. Therefore, for the purpose of stability and high efficiency in the control process, an adjusted threshold $\Delta F$ is needed. Once the deviation reaches the adjusted threshold $\Delta F$, adjustment is made. But because of instability in the loosening process, the adjustment quantity of the load control motor each time is different. Thus, a second group of reference experiment is needed. The experiment of adjusting the transverse load is made to the bolt specimen: in the process of applying the transverse load, times $t_1, t_2 \ldots t_n$ are selected uniformly in a interval $[0,t_n]$; the loosening process is divided into n intervals, i.e., $[0, t_1]$, $[t_1, t_2] \ldots [t_{n-1}, t_n]$, wherein $t_n$ is a time at which the loosening curve tends to be steady; at times $t_1, t_2 \ldots t_n$, the displacement is changed by the load control motor 17 so that the variation of the force load amplitude measured by the S-shaped column type pressure sensor 8 is $\Delta F$; the corresponding variation $\Delta X_i$ of the displacement of the load control motor 17 is recorded; and $\Delta X_1, \Delta X_2 \ldots \Delta X_n$ and $i \in [1,n]$ are recorded;

when the spacer type pressure sensor (29) collects bolt preload signals, the change rate $$k = \frac{\partial P(t)}{\partial t}.$$

of bolt preload is analyzed, i.e., a slope of a real-time loosening curve; the larger the slope is, the faster the loosening is; the real-time loosening curve is compared with a previously measured loosening law curve so as to estimate the change of the transverse force load of a next stage in combination with the loosening law curve and the change law curve of the transverse force load amplitude, thereby estimating a time interval $T_x$ of the change $\Delta F$ of the transverse force load. i.e., the variation of the transverse force load amplitude is less than the threshold $\Delta F$ within the time $T_x$ from this moment; the transverse load is not required to be adjusted; and judgment is made to obtain a interval of the transverse load at this moment so as to correspondingly select $\Delta X_x$.

After the suspension time $T_x$ of the closed-loop control program, the load control motor is adjusted by one step to generate displacement change $\Delta X_x$; the transverse force load is changed by $\Delta F$; and at this moment, the difference between the transverse loads F and $F_1$ is small. But further precision processing is needed because more or less errors may appear during actual operation under the condition that previous adjustment is based on estimation and adjustment in combination with the law curves and the change law curve of the transverse force load amplitude. Therefore, transverse force load signals shall be collected, and peak detection is conducted on the periodical transverse force load signals collected by the S-shaped column type pressure sensor 8 to acquire the practical force load amplitude F;

If $|F_1-F|<e$ at this moment, this step of adjustment is completed; if $|F_1-F|>e$, next step of fine adjustment is conducted to gradually approach $F_1$. During fine adjustment, because the difference between the transverse loads F and $F_1$ is small, the stability of the transverse load is relatively better during adjustment. Meanwhile, k values of preload signals $$k = \frac{\partial P(t)}{\partial t}$$

at are collected for comparison, to estimate the time interval $T_x$ required for the reduction $\Delta F$ of the next transverse force load; and then circulation is continued, so that the difference between the actual force load amplitude and the ideal force amplitude is always kept within an allowable scope $\Delta F$, thereby ensuring accuracy of the displacement load.

We claim:
1. A closed-loop control method for a transverse force load based on a testing machine for accurately controlling looseness of a bolt transverse load, wherein the closed-loop control method conducts control based on the testing machine for accurately controlling looseness of a bolt transverse load, analyzes a signal connected by a sensor, conducts calculation through a PLC control system and finally issues an instruction to a motor control system for controlling the rotation of the motor, thereby realizing control of the testing machine for looseness of the bolt transverse load;

the closed-loop control method is realized based on the testing machine for accurately controlling the looseness of the transverse load; the testing machine for accurately controlling the looseness of the transverse load comprises a load transfer part and a load control part; the load transfer part comprises a frame structural member (1), a displacement sensor support frame (2), a current vortex displacement sensor (3), a connecting plate (4), a pin (5), a limiting plate (6), a first support frame (7-1), a second support frame (7-2), an S-shaped column type displacement sensor (8), an elastic rod (9), a first linear bearing (10-1), a second linear bearing (10-2), a T-groove guide rail (22), a short-head threaded rod (23), a long-head threaded rod (24), a base station (26), a rotatable rod (27), a round cushion (28), a spacer type pressure sensor (29), a sleeve (30) and a specimen bolt (31); two support frames and the frame structural member (1) are fixed to the base station (26); the two support frames are coaxial and are spaced by a certain distance; the frame structural member (1) is located at one side of the two support frames; the T-groove guide rail (22) penetrates through the first linear bearing (10-1); the first linear bearing (10-1) is fixed to the first support frame (7-1); the T-groove guide rail (22) is tenoned with one end of the elastic rod (9); the other end of the elastic rod (9) is tenoned with the short-head threaded rod (23); the short-head threaded rod (23) is in thread fit with one end of the S-shaped column type displacement sensor (8); the other end of the S-shaped column type displacement sensor (8) is in thread fit with the long-head threaded rod (24); the long-head threaded rod (24) penetrates through the second linear bearing (10-2); the second linear bearing (10-2) is fixed to the second support frame (7-2); the long-head threaded rod (24) is tenoned with the rotatable rod (27); the rotatable rod (27) is placed in a U-groove of the connecting plate (4) and is limited through the limiting plate (6); the connecting plate (4) is placed on an upper stair of the frame structural member (1); the displacement sensor support frame (2) is fixed to a lower stair of the frame structural member (1); the current vortex displacement sensor (3) is fixed to the displacement sensor support frame (2); the plane of the frame structural member (1) is in a stair type;

a through hole is formed in the connecting plate (4); the round cushion (28) is in interference fit with the through hole; a stepped hole is formed in the plane of the frame structural member (1); the stepped hole is coaxial with the through hole; the spacer type pressure sensor (29) is placed in the stepped hole; the sleeve (30) penetrates through the spacer type pressure sensor (29); the specimen bolt (31) penetrates through the stepped hole and the through hole successively and is fixed;

the load control part comprises a load generating motor (11), an eccentric coupling (12), dual brackets (13), slide blocks (14), guide rails (15), a screw rod (16), a load control motor (17), a slide table (18), a load-bearing frame (19), a rocking bar (20) and a shaft (21); the load-bearing frame (19) is composed of a transverse bracket, a longitudinal bracket and a base; the load-bearing frame (19) is fixed to the base station (26) through the base; one end of the screw rod (16) penetrates through the transverse bracket, and is connected with the load control motor (17); the load control motor (17) is fixed to the longitudinal bracket; the other end of the screw rod (16) is fixed to the base; the slide table (18) is connected with a ball screw rod structure of the screw rod (16) together; two guide rails (15) are fixed to the longitudinal bracket; two slide blocks (14) are sheathed on the guide rails (15); dual brackets (13) are composed of two side plates and a bottom plate; the bottom plate is fixed to the two slide blocks (14) and the slide table (18); the shaft (21) penetrates through the two side plates of dual brackets (13) and is fixed; one end of the rocking bar (20) is a round sleeve structure; the other end is provided with a notch and a T type lug boss; the through hole of the rocking bar (20) penetrates through the shaft (21) and is located between the two side plates; the load generating motor (11) is fixed to the base station (26); one end of the eccentric coupling (12) is connected with an output shaft of the load generating motor (11); the other end of the eccentric coupling (12) is limited to the notch of the rocking bar (20); the T type lug boss of the rocking bar (20) is matched with the T-groove guide rail (22);

the closed-loop control method for controlling a transverse force load amplitude based on the testing machine for accurately controlling the looseness of the transverse load comprises the following steps:

step a) determining a to-be-inputted expected transverse force load amplitude $F_1$, an adjusted threshold $\Delta F$ and an error allowable value e; and starting to operate by the load control motor (17) if a difference between the practical transverse force load amplitudes F and $F_1$ reaches the adjusted threshold $\Delta F$, until the difference between the practical transverse force load amplitudes F and $F_1$ is less than the error allowable value e;

step b) making a loosening law curve of a bolt under the condition of not adjusting the transverse load, and recording a change law curve of the corresponding transverse force load amplitude;

step c) conducting a transverse load adjusting experiment on the bolt specimen: in the process of applying the transverse load, selecting times $t_1, t_2 \ldots t_n$ uniformly in a interval $[0,t_n]$; dividing the loosening process into n intervals, i.e., $[0, t_1], [t_1, t_2] \ldots [t_{n-1}, t_n]$, wherein $t_n$ is a time at which the loosening curve tends to be steady; at times $t_1, t_2 \ldots t_n$, changing the displacement by the load control motor (17) so that the variation of the force load amplitude measured by the S-shaped column type pressure sensor (8) is $\Delta F$; recording the corresponding variation $\Delta X_i$ of the displacement of the load control motor (17); and recording $\Delta X_1, \Delta X_2 \ldots \Delta X_n$ and $i \in [1,n]$;

step d) collecting, by the spacer type pressure sensor (29), continuous pretightening force signals P(t) and $$k = \frac{\partial P(t)}{\partial t};$$

step e) comparing a slope of curve in the loosening law curve in step b) with a k value in step d); comparing the k value at this moment with the n intervals divided in step c); determining the interval to which the bolt loosening belongs, i.e., slope values of curves are equal, wherein the reduction of the transverse force load amplitude for each interval in step c) is equal to the to-be-adjusted displacement value $\Delta X_x$ for the adjusted threshold $\Delta F$; estimating the to-be-adjusted displacement value $\Delta X_x$ when the reduction of the transverse force load amplitude starts to be equal to the adjusted threshold $\Delta F$ from this moment in the loading process; estimating the time $T_x$ required when the reduction of the transverse force load amplitude is equal to the adjusted threshold $\Delta F$ from this moment in the loading process in combination with the change law curve of the transverse force load amplitude in step b), i.e., the variations of the transverse force load amplitude within the time [0,T] are less than the threshold $\Delta F$ without adjusting the transverse load, wherein the suspension time of a closed-loop control program is $T_x$;

step f) making one-step adjustment $\Delta X_x$ on the load control motor (17) according to the estimated $\Delta X_x$ in step e) since the variation of the transverse force load amplitude exceeds the threshold $\Delta F$ after the suspension time $T_x$, so that the difference between the practical transverse force load amplitude F and the expected transverse force load amplitude $F_1$ is reduced to be less than the adjusted threshold $\Delta F$;

step g) collecting transverse force load signals, and conducting peak detection on the periodical transverse force load signals collected by the S-shaped column type pressure sensor (8) to acquire the practical force load amplitude F;

step h) approaching $F_1$ through a two-step method if $|F-F_1|>e$ which indicates that an adjusted final result fails to be within the set error, until $|F-F_1|<e$; and then circularly operating from step d);

step i) circularly operating directly from step d) if $|F-F_1|<e$.

2. A closed-loop control method for a transverse displacement load based on a testing machine for accurately controlling loosening of a bolt transverse load, wherein the closed-loop control method conducts control based on the testing machine for accurately controlling loosening of a bolt transverse load, analyzes a signal connected by a sensor, conducts calculation through a PLC control system and finally issues an instruction to a motor control system for controlling the rotation of the motor, thereby realizing control of the testing machine for loosening of the bolt transverse load;

the closed-loop control method is realized based on the testing machine for accurately controlling the looseness of the transverse load; the testing machine for accurately controlling the looseness of the transverse load comprises a load transfer part and a load control part;

the load transfer part comprises a frame structural member (1), a displacement sensor support frame (2), a current vortex displacement sensor (3), a connecting plate (4), a pin (5), a limiting plate (6), a first support frame (7-1), a second support frame (7-2), an S-shaped column type displacement sensor (8), an elastic rod (9), a first linear bearing (10-1), a second linear bearing (10-2), a T-groove guide rail (22), a short-head threaded rod (23), a long-head threaded rod (24), a base station (26), a rotatable rod (27), a round cushion (28), a spacer type pressure sensor (29), a sleeve (30) and a specimen bolt (31); two support frames and the frame structural member (1) are fixed to the base station (26); the two support frames are coaxial and are spaced by a certain distance; the frame structural member (1) is located at one side of the two support frames; the T-groove guide rail (22) penetrates through the first linear bearing (10-1); the first linear bearing (10-1) is fixed to the first support frame (7-1); the T-groove guide rail (22) is tenoned with one end of the elastic rod (9); the other end of the elastic rod (9) is tenoned with the short-head threaded rod (23); the short-head threaded rod (23) is in thread fit with one end of the S-shaped column type displacement sensor (8); the other end of the S-shaped column type displacement sensor (8) is in thread fit with the long-head threaded rod (24); the long-head threaded rod (24) penetrates through the second linear bearing (10-2); the second linear bearing (10-2) is fixed to the second support frame (7-2); the long-head threaded rod (24) is tenoned with the rotatable rod (27); the rotatable rod (27) is placed in a U-groove of the connecting plate (4) and is limited through the limiting plate (6); the connecting plate (4) is placed on an upper stair of the frame structural member (1); the displacement sensor support frame (2) is fixed to a lower stair of the frame structural member (1); the current vortex displacement sensor (3) is fixed to the displacement sensor support frame (2); the plane of the frame structural member (1) is in a stair type;

a through hole is formed in the connecting plate (4); the round cushion (28) is in interference fit with the through hole; a stepped hole is formed in the plane of the frame structural member (1); the stepped hole is coaxial with the through hole; the spacer type pressure sensor (29) is placed in the stepped hole; the sleeve (30) penetrates through the spacer type pressure sensor (29); the specimen bolt (31) penetrates through the stepped hole and the through hole successively and is fixed;

the load control part comprises a load generating motor (11), an eccentric coupling (12), dual brackets (13), slide blocks (14), guide rails (15), a screw rod (16), a load control motor (17), a slide table (18), a load-bearing frame (19), a rocking bar (20) and a shaft (21); the load-bearing frame (19) is composed of a transverse bracket, a longitudinal bracket and a base; the load-bearing frame (19) is fixed to the base station (26) through the base; one end of the screw rod (16) penetrates through the transverse bracket, and is connected with the load control motor (17): the load control motor (17) is fixed to the longitudinal bracket; the other end of the screw rod (16) is fixed to the base; the slide table (18) is connected with a ball screw rod structure of the screw rod (16) together, two guide rails (15) are fixed to the longitudinal bracket; two slide blocks (14) are sheathed on the guide rails (15); dual brackets (13) are composed of two side plates and a bottom plate; the bottom plate is fixed to the two slide blocks (14) and the slide table (18); the shaft (21) penetrates through the two side plates of dual brackets (13) and is fixed; one end of the rocking bar (20) is a round sleeve structure; the other end is provided with a notch and a T type lug boss; the through hole of the rocking bar (20) penetrates through the shaft (21) and is located between the two side plates; the load generating motor (11) is fixed to the base station (26); one end of the eccentric coupling (12) is connected with an output shaft of the load generating motor (11); the other end of the eccentric coupling (12) is limited to the notch of the rocking bar (20); the T type lug boss of the rocking bar (20) is matched with the T-groove guide rail (22);

the closed-loop control method for controlling a transverse displacement load amplitude based on the testing machine for accurately controlling the loosening of the transverse load comprises the following steps:

step a) determining a to-be-inputted expected transverse force load amplitude $A_1$, an adjusted threshold $\Delta A$ and an error allowable value e; and starting to operate by the load control motor (17) if a difference between the practical transverse force load amplitudes A and $A_1$ reaches the adjusted threshold $\Delta A$, until the difference between the practical transverse force load amplitudes A and $A_1$ is less than the error allowable value e;

step b) making a loosening law curve of a bolt under the condition of not adjusting the transverse load, and recording a change law curve of the corresponding transverse displacement load amplitude;

step c) conducting a transverse load adjusting experiment on the bolt specimen: in the process of applying the transverse load, selecting times $t_1, t_2 \ldots t_n$ uniformly in a interval $[0, t_n]$; dividing the loosening process into n intervals, i.e., $[0, t_1], [t_1, t_2] \ldots [t_{n-1}, t_n]$, wherein $t_n$ is a time at which the loosening curve tends to be steady; at times $t_1, t_2 \ldots t_n$, changing the displacement by the load control motor (17) so that the variation of the displacement load amplitude measured by the current vortex displacement sensor (3) is $\Delta A$; recording the corresponding variation $\Delta X_i$ of the displacement of the load control motor (17); and recording $\Delta X_1, \Delta X_2 \ldots \Delta X_n$ and $i \in [1, n]$;

step d) collecting, by the spacer type pressure displacement sensor (29), continuous pretightening force signals P(t) and $$k = \frac{\partial P(t)}{\partial t};$$

step e) comparing a slope of curve in the loosening law curve in step b) with a k value in step d); comparing the k value at this moment with the n intervals divided in step c); determining the interval to which the bolt loosening belongs, i.e., slope values of curves are equal, wherein the reduction of the transverse displacement load amplitude for each interval in step c) is equal to the to-be-adjusted displacement value $\Delta X_x$ for the adjusted threshold $\Delta A$; estimating the to-be-adjusted displacement value $\Delta X_x$ when the reduction of the transverse displacement load amplitude starts to be equal to the adjusted threshold $\Delta A$ from this moment in the loading process; estimating the time $T_x$ required when the reduction of the transverse displacement load amplitude is equal to the adjusted threshold $\Delta A$ from this moment in the loading process in combination with the change law curve of the transverse displacement load amplitude in step b), i.e., the variations of the transverse displacement load amplitude within the time [0,T] are less than the threshold $\Delta A$ without adjusting the transverse load, wherein the suspension time of a closed-loop control program is $T_x$;

step f) making one-step adjustment $\Delta X_x$ on the load control motor (17) according to the estimated $\Delta X_x$ in step e) since the variation of the transverse displacement load amplitude exceeds the threshold $\Delta A$ after the suspension time $T_x$, so that the difference between the practical transverse displacement load amplitude A and the expected transverse force load amplitude $A_1$ is reduced to be less than the adjusted threshold $\Delta A$;

step g) collecting transverse displacement load signals, and conducting peak detection on the periodical transverse displacement load signals collected by the current vortex displacement sensor (3) to acquire the practical displacement load amplitude A;

step h) approaching $F_1$ through a two-step method if $|A-A_1|>e$ which indicates that an adjusted final result fails to be within the set error, until $|A-A_1|<e$; and then circularly operating from step d);

step i) circularly operating directly from step d) if $|A-A_1|<e$.

\* \* \* \* \*